(12) United States Patent
Wong

(10) Patent No.: US 10,208,988 B2
(45) Date of Patent: Feb. 19, 2019

(54) CENTRAL AIR CONDITIONING AND HEAT PUMP SYSTEM WITH ENERGY EFFICIENT ARRANGEMENT

(71) Applicant: Lee Wa Wong, Pico Rivera, CA (US)

(72) Inventor: Lee Wa Wong, Pico Rivera, CA (US)

( * ) Notice: Subject to any disclaimer, the term of this patent is extended or adjusted under 35 U.S.C. 154(b) by 471 days.

(21) Appl. No.: 15/144,426

(22) Filed: May 2, 2016

(65) Prior Publication Data

US 2017/0314822 A1 Nov. 2, 2017

(51) Int. Cl.
*F25B 13/00* (2006.01)
*F25B 25/00* (2006.01)
*F25B 7/00* (2006.01)
*F25B 30/02* (2006.01)

(52) U.S. Cl.
CPC ............ *F25B 13/00* (2013.01); *F25B 25/005* (2013.01); *F25B 7/00* (2013.01); *F25B 30/02* (2013.01); *F25B 2313/003* (2013.01); *F25B 2339/047* (2013.01)

(58) Field of Classification Search
CPC F25B 13/00; F25B 2313/00; F25B 2313/003; F25B 2339/047; F25B 7/00; F25B 41/046; F25B 30/02; F25B 25/005
See application file for complete search history.

(56) References Cited

U.S. PATENT DOCUMENTS

| 4,111,259 A | 9/1978 | Lebduska |
| 4,227,382 A | 10/1980 | Coyne |
| 6,553,777 B2 | 4/2003 | Dillenback |
| 2010/0326127 A1 | 12/2010 | Oomura et al. |
| 2016/0040895 A1 | 2/2016 | Wong |

*Primary Examiner* — Frantz Jules
*Assistant Examiner* — Daniel C Comings
(74) *Attorney, Agent, or Firm* — Tsz Lung Yeung

(57) ABSTRACT

An air conditioning and heat pump system includes a main heat exchange system, a heat distribution system and an energy efficient arrangement. The energy efficient arrangement includes a first energy saver heat exchanger connected to a first main heat exchanger and the second main heat exchanger of the main heat exchange system, a second pumping device connected to the first energy saver heat exchanger, and a pre-heating heat exchanger supported in the supporting frame at a positioned between a ventilating heat exchanging unit and an air intake opening of a ventilating device. The pre-heating heat exchanger is connected to the second pumping device and the first energy saver heat exchanger.

21 Claims, 7 Drawing Sheets

CENTRAL AIR CONDITIONING AND HEAT PUMP SYSTEM WITH ENERGY EFFICIENT ARRANGEMENT

BACKGROUND OF THE PRESENT INVENTION

Field of Invention

The present invention relates to a central air conditioning and heat pump system which comprises an energy efficient arrangement configured to save a substantial amount of energy when the air conditioning and heat pump system is being operated in a heat pump mode.

Description of Related Arts

Conventional air conditioning and heat pump systems may be broadly divided into two main types. The first type is air conditioning and heat pump systems which are arranged to directly heat up or cool down the air of an indoor space. An example of the first type is window-type air conditioning and/or heat pump units, which controllably suck air from the indoor space and directly heat up or cool down the air. After the air has been heated or cooled, it is delivered back to the indoor space.

The second type is central air conditioning heat pump systems in which a heat exchange medium (usually water) may be used to heat up or cool down air in the indoor space. Referring to FIG. 1 to FIG. 2 of the drawings, the central air conditioning and heat pump system comprises a main heat exchange system 10P and a heat delivery system 20P. The main heat exchange system 10P comprises an outer casing 11P, a compressor 12P, at least one heat exchanger 13P, a gas-liquid heat exchanging device 14P, and a fan assembly 15P. The main heat exchange system 10P is usually installed on a roof of a building so that it may absorb heat from or discharge heat to ambient air. A predetermined amount of refrigerant may circulate through the compressor 12P, the heat exchanger 13P, the gas-liquid heat exchanging device 14P for carrying out several heat exchanging processes.

On the other hand, the heat delivery system 20P comprises a water pump 21P and a water pipeline system 22P connected to the water pump 21P. The water pipeline system 22P is configured to transport water to different designated indoor spaces in the building. The water circulating in the heat delivery system 20P is arranged to perform heat exchange with the refrigerant in the gas-liquid heat exchanging device 14P of the main heat exchange system 10P. Furthermore, the heat delivery system 20P may further comprise a fresh air supplying device 23P connected to the water pipeline system 22P. As shown in FIG. 1 of the drawings, the fresh air supplying device 23P usually comprises a supporting frame 231P, a centrifugal fan 232P received in the supporting frame 231P, and a fresh air heat exchanger 233P also received in the supporting frame 231P. The supporting frame 231P has an air inlet 2311P, wherein ambient air may be drawn into the fresh air supplying device 23P through the air inlet 2311P.

The refrigerant circulating in the main heat exchange system 10 is arranged to absorb heat from ambient air and release heat to the water circulating through the gas-liquid heat exchanging device 14P. The water having absorbed heat from the refrigerant is then pumped to various terminal devices such as the fresh air supplying device 23P. The purpose of the terminal devices is to regulate and ventilate air to and from a designated indoor space. Within a heat delivery system 20P, there may exist a number of terminal devices which may include the above-mentioned fresh air supplying device 23P, or other air handlers.

The water delivered to the fresh air supplying device 23P is arranged to carry out heat exchange with the ambient air in the fresh air heat exchanger 233P. The water is arranged to release heat to the air. The heated air may be transported to designated indoor space for supplying fresh air to the indoor environment. The heating of the ambient air is essential because the temperature of the ambient air is usually very low and that is the very reason why the central air conditioning heat pump system is used to generate heat in the indoor space.

When the temperature of the ambient air is very low, supplying fresh air of a desirable temperature to the indoor space means a substantial amount of energy is needed to heat up the ambient air in the fresh air supplying device 23P. The amount of energy required to heat up the water circulating in the heat delivery system 20P depends on the temperature of the refrigerant passing through the gas-liquid heat exchanging device 14P. This temperature ultimately depends on the work produced by and the efficiency of the compressor 12P.

Although the above-mentioned air conditioning and heat pump systems have widely been utilized around the world for many years, these systems suffer a common deficiency of a relatively low Coefficient of Performance (COP), which may be defined as a ratio of heat supplied to or removed from a reservoir to the work required.

Accordingly, there is a need to develop an air conditioning and heat pump system which has substantially improved COP.

SUMMARY OF THE PRESENT INVENTION

Certain variations of the present invention provide an air conditioning and heat pump system which comprises an energy efficient arrangement configured to save a substantial amount of energy when the air conditioning and heat pump system is being operated in a heat pump mode.

Certain variations of the present invention provide an air conditioning and heat pump system which comprises an energy efficient arrangement configured to pre-heat ambient air before it is delivered to a ventilating heat exchanging unit.

Certain variations of the present invention provide an air conditioning and heat pump system which is capable of producing more heat to designated indoor space for a given work done by the system as compared with conventional air conditioning and heat pump system as described above.

In one aspect of the present invention, the present invention provides an air conditioning and heat pump system, comprising:

a plurality of connecting pipes;

a main heat exchange system, which comprises:

a main casing;

a compressor supported in the main casing, the compressor having a compressor outlet and a compressor inlet;

a first main heat exchanger supported in the main casing and connected to the compressor through at least one of the connecting pipes; and a second main heat exchanger supported in the main casing and connected to the compressor and the first heat exchanger through at least one of the connecting pipes;

a heat distribution system, which comprises:

a first pumping device connected to the first main heat exchanger of the main heat exchange system through at least one of the connecting pipes; and at least one terminal device connected to the first pumping device and the first main heat exchanger through at least one of the connecting pipes, and comprises:

a ventilating device, which comprises:

a supporting frame having an air intake opening exposed to ambient air for allowing intake of air through the air intake opening;

a ventilating heat exchanging unit supported in the supporting frame and connected to the first pumping device and the first main heat exchanger for pre-heating the ambient air drawn from the air intake opening; and a centrifugal fan unit supported in the supporting frame for drawing ambient air through the air intake opening, and delivering air to a predetermined indoor space; and an energy efficient arrangement, which comprises:

a first energy saver heat exchanger connected to the first main heat exchanger and the second main heat exchanger through at least one of the connecting pipes;

a second pumping device connected to the first energy saver heat exchanger through at least one of the connecting pipes; and a second energy saver heat exchanger supported in the supporting frame at a positioned between the ventilating heat exchanging unit and the air intake opening, the second energy saver heat exchanger being connected to the second pumping device and the first energy saver heat exchanger, the air conditioning and heat pump system being selectively operated between an air conditioning mode and a heat pump mode, wherein in the air conditioning mode, a predetermined amount of vaporous refrigerant is arranged to leave the compressor and guided to enter the second main heat exchanger for releasing heat thereto, the refrigerant leaving the second main heat exchanger being guided to flow into the first main heat exchanger for absorbing heat, the refrigerant leaving the first main heat exchanger being guided to flow back to the compressor to complete an air conditioning cycle, a predetermined amount of water circulating through the ventilating device and the first main heat exchanger for releasing heat to the refrigerant, the water leaving the first energy saver heat exchanger being guided to flow into the ventilating heat exchanging unit for heating the ambient air flowing through the air intake opening;

wherein in the heat pump mode, a predetermined amount of vaporous refrigerant is arranged to leave the compressor and guided to flow into the first main heat exchanger for releasing heat to a predetermined amount of water circulating through the first main heat exchanger, the refrigerant leaving the first main heat exchanger being guided to flow into the first energy saver heat exchanger for releasing heat to the water circulating through the first energy saver heat exchanger, the refrigerant leaving the first energy saver heat exchanger being guided to flow into the second main heat exchanger for absorbing heat, the refrigerant leaving the second main exchanger being guided to flow to back the compressor to complete a heat pump cycle, the water circulating through the first energy saver heat exchanger for absorbing heat from the refrigerant, the water leaving the first energy saver heat exchanger being guided to flow into the second energy saver heat exchanger for releasing heat to the ambient air flowing through the air intake opening.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
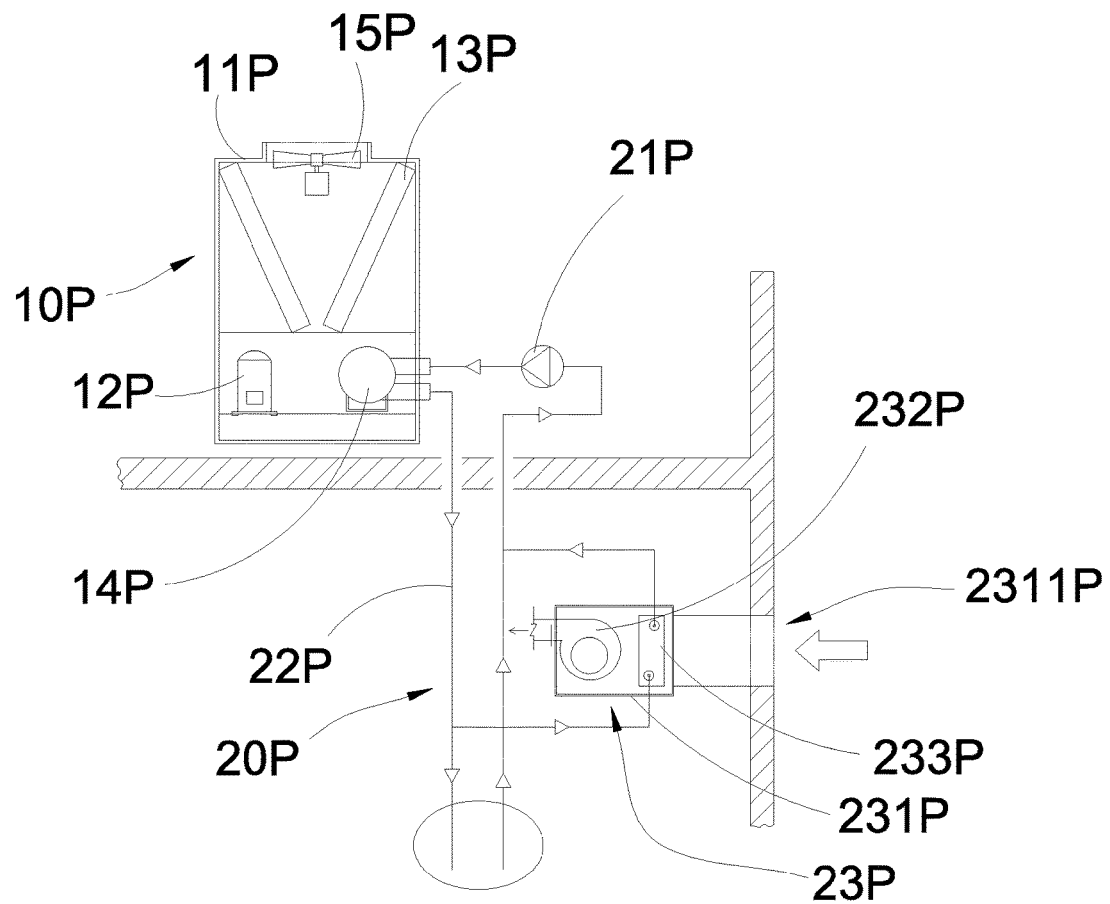
FIG. 1 is schematic diagram of a conventional central air conditioning and heat pump system.
Figure 2:
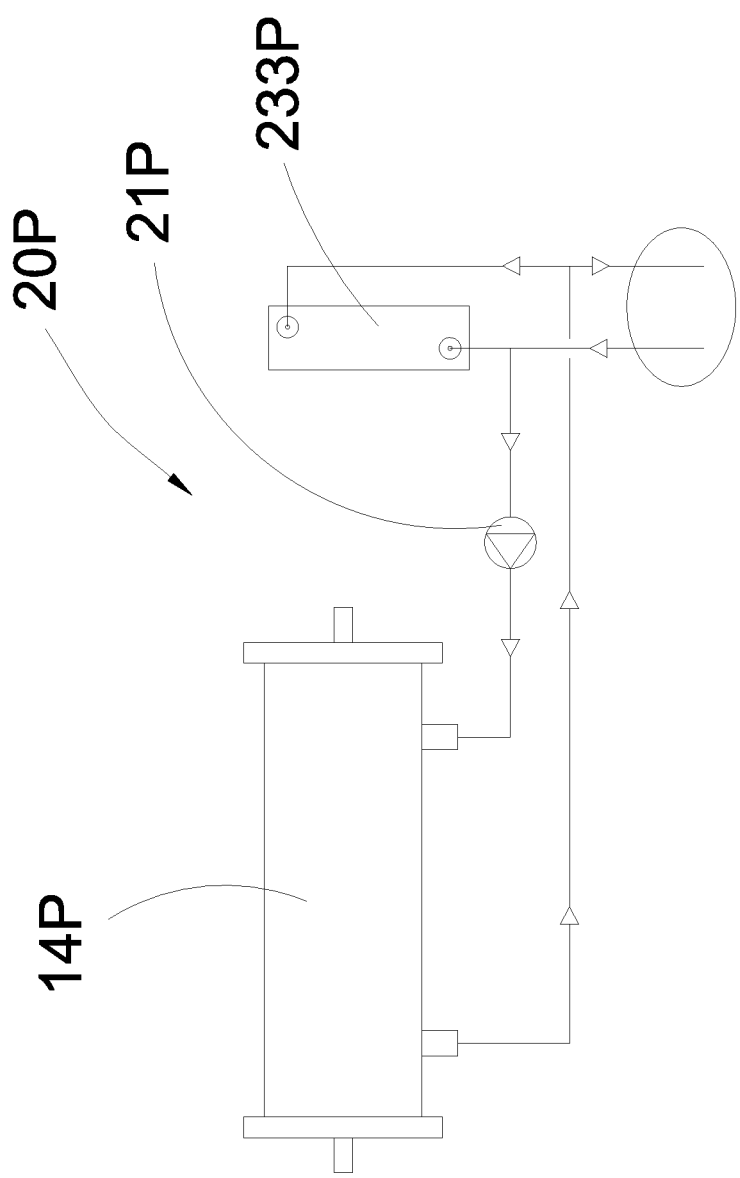
FIG. 2 is schematic diagram of a heat delivery system of a conventional central air conditioning and heat pump system.
Figure 3:
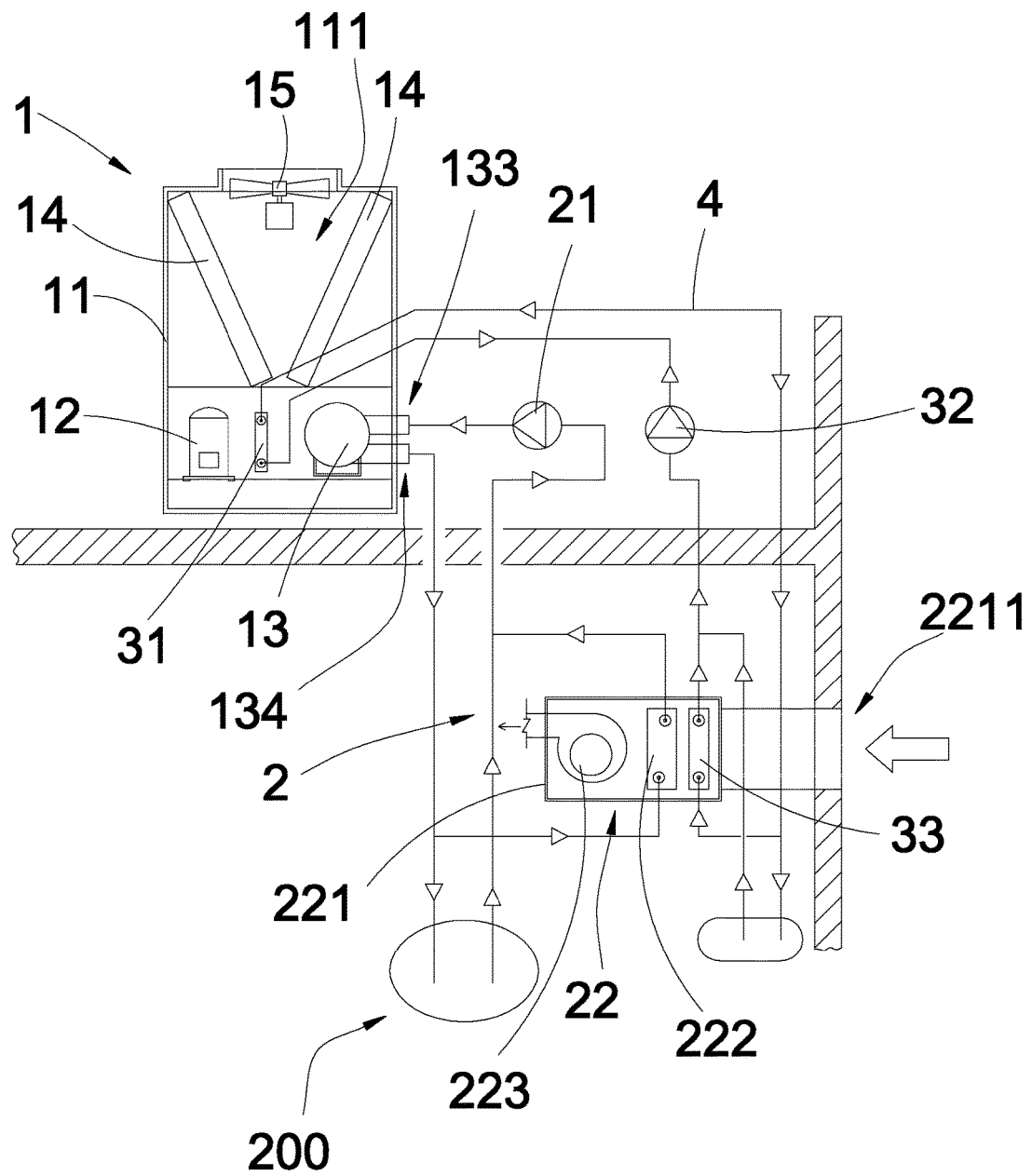
FIG. 3 is a schematic diagram of an air conditioning and heat pump system according to a first preferred embodiment of the present invention.
Figure 4:
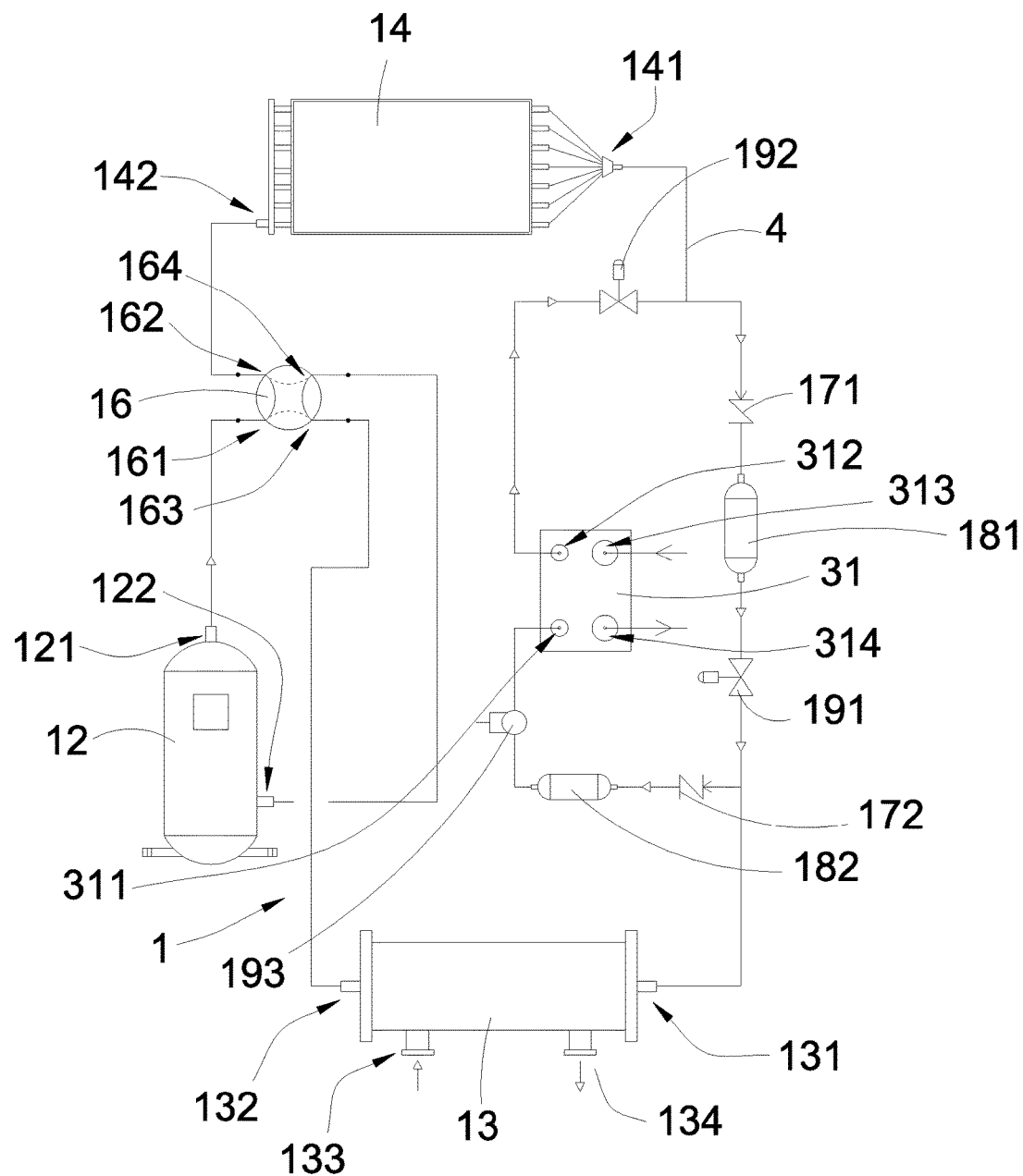
FIG. 4 is a schematic diagram of the air conditioning and heat pump system according to the first preferred embodiment of the present invention, illustrating a flow path of refrigerant.

Referring to FIG. 3 to FIG. 4 of the drawings, an air conditioning and heat pump system according to a first preferred embodiment of the present invention is illustrated. Broadly, the air conditioning and heat pump system may comprise a main heat exchange system 1, and a heat distribution system 2 connected to the main heat exchange system 1. A predetermined amount of refrigerant may circulate through the various components (described below) of the main heat exchange system 1, while a predetermined amount of water may circulate through various components (described below) of the heat distribution system 2. The refrigerant and the water may circulate through the various components through a plurality of connecting pipes 4.

The main heat exchange system 1 may comprise a main casing 11, a compressor 12, a first main heat exchanger 13, and at least one second main heat exchanger 14. The compressor 12 may be supported in the main casing 10, and may have a compressor outlet 121 and a compressor inlet 122.

The first main heat exchanger 13 may be supported in the main casing 11 and connected to the compressor 12 through at least one of the connecting pipes 4. The second main heat exchanger 14 may also be supported in the main casing 11 and connected to the compressor 12 and the first main heat exchanger 13 through at least one of the connecting pipes 4.

The heat distribution system 2 may comprise a first pumping device 21, and a terminal device 200 comprising a ventilating device 22. The first pumping device 21 may be connected to the first main heat exchanger 13 of the main heat exchange system 1 through at least one of the connecting pipes 4. The ventilating device 22 may be connected to the first pumping device 21 and the first main heat exchanger 13 through at least one of the connecting pipes 4, and comprises a supporting frame 221, a ventilating heat exchanging unit 222, and a centrifugal fan unit 223. The supporting frame 221 may have an air intake opening 2211 exposed to ambient air for allowing intake of air through the air intake opening 2211.

The ventilating heat exchanging unit 222 may be supported in the supporting frame 221 and connected to the first pumping device 21 and the first main heat exchanger 13 for heating the ambient air drawn from the air intake opening 2211, so that the fresh air delivered to the indoor space is of certain warm temperature.

The centrifugal fan unit 223 may be supported in the supporting frame 221 for drawing ambient air through the air intake opening 2211, and is arranged to deliver air to a predetermined indoor space.

The energy efficient arrangement 3 may comprise a first energy saver heat exchanger 31, a second pumping device 32, and a pre-heating heat exchanger 33. The first energy saver heat exchanger 31 may be connected to the first main heat exchanger 13 and the second main heat exchanger 14 through at least one of the connecting pipes 4.

The second pumping device 32 may be connected to the first energy saver heat exchanger 31 through at least one of the connecting pipes 4. The pre-heating heat exchanger 33 may be supported in the supporting frame 221 at a positioned between the ventilating heat exchanging unit 222 and the air intake opening 2211. Moreover, the pre-heating heat exchanger 33 may be connected to the second pumping device 32 and the first energy saver heat exchanger 31.

The air conditioning and heat pump system of the present invention may be selectively operated between an air conditioning mode and a heat pump mode. In the air conditioning mode, a predetermined amount of vaporous refrigerant may be arranged to leave the compressor 12 and guided to enter the second main heat exchanger 14 for releasing heat. The refrigerant leaving the second main heat exchanger 14 may be guided to flow into the first main heat exchanger 13 for absorbing heat. The refrigerant leaving the first main heat exchanger 13 may be guided to flow back to the compressor 12 to complete an air conditioning cycle.

On the other hand, when the air conditioning and heat pump system is operated in the heat pump mode, a predetermined amount of vaporous refrigerant may be arranged to leave the compressor 12 and guided to flow into the first main heat exchanger 13 for releasing heat to a predetermined amount of water circulating through the first main heat exchanger 13. The refrigerant leaving the first main heat exchanger 13 may be guided to flow into the first energy saver heat exchanger 31 for releasing heat to the water circulating through the first energy saver heat exchanger 31. The refrigerant leaving the first energy saver heat exchanger 31 may be guided to flow into the second main heat exchanger 14 for absorbing heat. The refrigerant leaving the second main exchanger 14 may be guided to flow to back the compressor 12 to complete a heat pump cycle.

At the same time, the water may be arranged to circulate through the first energy saver heat exchanger 31 for absorbing heat from the refrigerant. The water leaving the first energy saver heat exchanger 31 may be guided to flow into the pre-heating heat exchanger 33 for releasing heat to the ambient air flowing through the air intake opening 2211.

According to the first preferred embodiment of the present invention, the main casing 11 may be installed on the roof of a building and may have a receiving cavity 111. The air conditioning and heat pump system of the present invention may be arranged to provide air conditioning and heating to designated indoor spaces in the building. As shown in FIG. 3 of the drawings, the compressor 12, the first main heat exchanger 13, and the first energy saver heat exchanger 31 may be supported at a lower portion of the main casing 11. The second main heat exchanger 13 may be supported at an upper portion of the main casing 11.

The main heat exchange system 1 may further comprise a main fan unit 15 provided on top of the main casing 11 for providing ventilation and allow air passage and heat exchange between the receiving cavity 111 and the ambient atmosphere.

The compressor 12 may be configured to pressurize the refrigerant flowing therethrough. It forms a starting point of refrigerant circulation for a typical air conditioning cycle or a heat pump cycle.

The first main heat exchanger 13 may have a first communicating port 131 and a second communicating port 132, and may be configured to perform heat exchange between the refrigerant and another working fluid such as water. The first main heat exchanger 13 may be configured to act as an evaporator (i.e. converting the refrigerant into gaseous or vaporous state) when the air conditioning and heat pump system is operated in the air conditioning mode. In the first preferred embodiment, the first main heat exchanger 13 may be configured to allow heat exchange between the refrigerant and the water flowing through the heat distribution system 2 (as shown in FIG. 3 and FIG. 4 of the drawings) so as to extract heat from the water. The heat so extracted is to be absorbed by the refrigerant which will be heated and turned into vaporous or gaseous state. The first communicating port 131 and the second communicating port 132 may form as an inlet or outlet for the refrigerant passing through the first main heat exchanger 13.

Moreover, the first main heat exchanger 13 may further have a third communicating port 133 and a fourth communicating port 134. The third communicating port 133 and the fourth communicating port 134 may be connected to the heat distribution system 2 and serve as an inlet and an outlet for water circulating through the heat distribution system 2 respectively.

On the other hand, the first main heat exchanger 13 may be configured to act as a condenser (i.e. converting the refrigerant into liquid state) when the air conditioning and heat pump system is operated in the heat pump mode. Thus, the first main heat exchanger 13 may be configured to allow heat exchange between the refrigerant and the water flowing through the heat distribution system 2 so as to extract heat from the refrigerant. The heat so extracted is to be absorbed by the water which will be heated to a certain temperature.

The second main heat exchanger 14 may have a first passage port 141 and a second passage port 142, and may be configured to perform heat exchange between the refrigerant and another working fluid such as air. The second main heat exchanger 14 may be configured to act as a condenser (i.e. converting the refrigerant into liquid state) when the air conditioning and heat pump system is operated in the air conditioning mode. In the first preferred embodiment, the second main heat exchanger 14 may be configured to allow heat exchange between the refrigerant and the ambient air drawn by the main fan unit 15 so as to extract heat from the refrigerant. The first passage port 141 and the second passage port 142 may form as an inlet or outlet for the refrigerant passing through the second main heat exchanger 14.

On the other hand, the second main heat exchanger 14 may be configured to act as an evaporator (i.e. converting the refrigerant into vaporous or gaseous state) when the air conditioning and heat pump system is operated in the heat pump mode. Thus, the second main heat exchanger 14 may be configured to allow heat exchange between the refrigerant and the ambient air so as to absorb heat from the ambient air.

It is important to note that the compressor 12, the first main heat exchanger 13 and the second main heat exchanger 14 of the main heat exchange system 1 and the ventilating heat exchanging unit 222 of the heat distribution system 2 may be arranged and connected through a plurality of connecting pipes 4 in certain configurations. An exemplary configuration is shown in FIG. 4 of the drawings.

The main heat exchange system 1 may further comprise a switching device 16 connecting between the first main heat exchanger 13 and the second main heat exchanger 14 for altering a flowing path of the refrigerant. Specifically, the switching device 16 may have first through fourth connecting port 161, 162, 163 164, and may be switched between an air conditioning switching mode and a heat pump switching mode, wherein in the air conditioning switching mode, the first connecting port 161 may be connected to the second connecting port 162 so that refrigerant may flow from the first connecting port 161 to the second connecting port 162, while the third connecting port 163 may be connected to the fourth connecting port 164 so that refrigerant may flow from the third first connecting port 163 to the fourth connecting port 164.

In the heat pump switching mode, the switching device 16 may be switched so that the first connecting port 161 may be connected to the third connecting port 163 so that refrigerant may flow from the first connecting port 161 to the third connecting port 163, while the second connecting port 162 may be connected to the fourth connecting port 164, so that refrigerant may flow from the second connecting port 162 to the fourth connecting port 164.

As shown in FIG. 4 of the drawings, the first connecting port 161 may be connected to the compressor outlet 121 of the compressor 12. The second connecting port 162 may be connected to the second passage port 142 of the second main heat exchanger 14. The third connecting port 163 may be connected to the second communicating port 132 of the first main heat exchanger 13. The fourth connecting port 164 may be connected to the compressor inlet 122 of the compressor 12.

The first passage port 141 of the second main heat exchanger 14 may be connected to the first communicating port 131 of the first main heat exchanger 13 through various components connected in parallel. An exemplary configuration is shown in FIG. 4 of the drawings. For the sake of clarity and ease of reading, the two parallel paths are designated path 1 and path 2 in FIG. 4. "Path" refers to the flowing path of the refrigerant.

The main heat exchange system 1 may further comprise a first unidirectional valve 171 and a second unidirectional valve 172 which are connected in path 1 and path 2 respectively. The first and second unidirectional valve 171, 172 may be configured to restrict the flow of refrigerant in one predetermined direction, and not vice versa. In the first preferred embodiment, the first unidirectional valve 171 may be configured to allow refrigerant to flow from the second main heat exchanger 14 toward the first main heat exchanger 13 through path 1. The second unidirectional valve 172 may be configured to allow refrigerant to flow from the first main heat exchanger 13 toward the second main heat exchanger 14 through path 2.

The main heat exchange system 1 may further comprise a first filtering device 181 and a second filtering device 182 connected to the first unidirectional valve 171 in path 1 and the second unidirectional valve 172 in path 2 respectively.

The first filtering device 181 and the second filtering device 182 may be configured to filter unwanted substances from the refrigerant which pass through them.

The main heat exchange system 1 may further comprise a first expansion valve 191 and a second expansion valve 192 connected to the first filtering device 181 in path 1 and the first energy saver heat exchanger 31 in path 2 respectively. The first expansion valve 191 and the second expansion valve 192 may be configured to control and regulate the flow of the refrigerant passing through them. Thus, the first energy saver heat exchanger 31 may be connected in path 2 between the second expansion valve 192 and the second filtering device 182.

The main heat exchange system 1 may further comprise a depressurizing valve 193 connected between the first energy saver heat exchanger 31 and the second filtering device 182 in path 2. The depressurizing valve 193 may be configured to lower the pressure of the refrigerant which passes through it.

The heat distribution system 2 may be arranged to retrieve the heat generated by the main heat exchange system 1 and distribute the heat to designated indoor spaces through at least one terminal device 200. One of such a terminal devices 200 may be the ventilating device 22 mentioned above.

The first energy saver heat exchanger 31 may be mounted in the main casing 11 of the main heat exchange system 1. The first energy saver heat exchanger 31 may have a first refrigerant inlet 311 connected to the depressurized valve 193, and a refrigerant outlet 312 connected to the second expansion valve 192 in path 2. On the other hand, the first energy saver heat exchanger 31 may further have a first water inlet 313 connected to the pre-heating heat exchanger 33 through the second pumping device 32, and a first water outlet 314 connected to the pre-heating heat exchanger 33 and to other terminal devices 200. Thus, the terminal devices 200 are connected in parallel with respect to the heat distribution system 2 and the energy efficient arrangement 3.

The operation of the present invention is as follows: the air conditioning and heat pump system described above involves a refrigerant flowing cycle and two water flowing cycles. The refrigerant may flow through the various components of the main heat exchange system 1 while the water may flow through the various components of the heat distribution system 2 and the energy efficient arrangement 3.

When the air conditioning and heat pump system is in the air conditioning mode, it is configured to generate cool air to designated indoor spaces. A refrigerant cycle starts from the compressor 12. Superheated or vaporous refrigerant may be arranged to leave the compressor 12 through the compressor outlet 121. The switching device 16 may be switched to air conditioning switching mode. The refrigerant leaving the compressor 12 may pass through the first connecting port 161, the second connecting port 162, and enter the second main heat exchanger 14 through the second passage port 142. The refrigerant may then perform heat exchange with a coolant such as ambient air so as to release heat to ambient air. The refrigerant may convert into liquid state after releasing heat. The refrigerant may then be guided to exit the second main heat exchanger 14 through the first passage port 141. The refrigerant leaving the second main heat exchanger 14 may then be guided to flow through the first unidirectional valve 171, the first filtering device 181, and the first expansion valve 181 connected in path 1. The refrigerant may be prevented from entering path 2 by the second unidirectional valve 172 at this time. The refrigerant may then be guided to enter the first main heat exchanger 13 through the first communicating port 131. The refrigerant entering the first main heat exchanger 13 may then be arranged to perform heat exchange with the water circulating in the heat distribution system 2 so as to absorb heat from the water and be converted back into vaporous or superheated state. The refrigerant may then be guided to leave the first main heat exchanger 13 through the second communicating port 132. The refrigerant may then be guided to flow through the third connecting port 163 and the fourth connecting port 164 of the switching device 16 and eventually flow back to the compressor 12 through the compressor inlet 122. This completes one refrigerant cycle for air conditioning mode.

On the other hand, a predetermined amount of water may circulate between the terminal devices 200 and the first main heat exchanger 13 through the first pumping device 21. The purpose of the water is to transfer the heat from the refrigerant to the terminal devices 200, which then deliver the heat to individual indoor spaces. As shown in FIG. 3 of the drawings, the refrigerant in the first main heat exchanger 13 may be arranged to absorb heat from the water also circulating in the first main heat exchanger 13. The water may then leave the first main heat exchanger 13 and flow into the terminal device 200 which may be connected in parallel.

An exemplary terminal device 200 is the ventilating device 22 shown in FIG. 3 of the drawings. The ventilating device 22 may be arranged to provide fresh air to designated indoor space. The water (having relatively cooler temperature than ambient air) from the first main heat exchanger 13 may be guided to flow through the ventilating heat exchanging unit 222 to lower the temperature of the air retrieved from the air intake opening 2211 because the water may be arranged to perform heat exchange with the ambient air which has a relatively higher temperature. The water having absorbed heat from the ambient air may have an increased temperature and may then be pumped by the first pumping device 21 to flow back to the first main heat exchanger 13 for carrying out another heat exchange cycle with the refrigerant.

Note that when the air conditioning and heat pump system is in the air conditioning mode, the energy efficient arrangement 3 may be deactivated.

When the air conditioning and heat pump system is in the heat pump mode, it is configured to generate heat to designated indoor spaces. The corresponding refrigerant cycle also starts from the compressor 12. Superheated or vaporous refrigerant may be arranged to leave the compressor 12 through the compressor outlet 121. The switching device 16 may be switched to heat pump mode. The refrigerant leaving the compressor 12 may pass through the first connecting port 161, the third connecting port 163, and enter the first main heat exchanger 13 through the second communicating port 132. The refrigerant may then perform heat exchange with the water so as to release heat to the water circulating in the first main heat exchanger 13. The refrigerant may be converted into liquid state after releasing heat. The refrigerant may then be guided to exit the first main heat exchanger 13 through the first communicating port 131. The refrigerant leaving the first main heat exchanger 13 may then be guided to flow through the second unidirectional valve 172, the second filtering device 182, and the depressurized valve 193 connected in path 2. Note that the refrigerant may be prevented from entering path 1 by the first unidirectional valve 171 at this time.

The refrigerant may then be guided to enter the first energy save heat exchanger 31 of the energy efficient arrangement 3 through the first refrigerant inlet 311 for releasing heat to the water flowing through the first energy saver heat exchanger 31. The refrigerant may then be arranged to flow out of the first energy saver heat exchanger 31 through the first refrigerant outlet 312 and is guided to flow through the second expansion valve 192 in path 2. The first unidirectional valve 171 may prevent the refrigerant from entering path 1. As a result, the refrigerant may then be guided to enter the second main heat exchanger 14 through the first passage port 141. The refrigerant may be arranged to perform heat exchange and absorb heat from ambient air in the second main heat exchanger 14. The refrigerant may then evaporate to become vaporous or superheated state. The refrigerant may then be guided to leave the second main heat exchanger 14 through the second passage port 142. The refrigerant may then be guided to flow through the second connecting port 162 and the fourth connecting port 164 of the switching device 16 and eventually flow back to the compressor 12 through the compressor inlet 122. This completes one refrigerant cycle for the heat pump mode.

On the other hand, a predetermined amount of water may circulate between the terminal devices 200 and the first main heat exchanger 13. The purpose of the water is to transfer the heat from the refrigerant to the terminal devices 200, which then deliver the heat to individual indoor spaces. As shown in FIG. 4 of the drawings, the refrigerant in the first main heat exchanger 13 may be arranged to absorb heat from the water also circulating in the first main heat exchanger 13. The water may enter the first main heat exchanger 13 through the third communicating port 133, and leave the first main heat exchanger 13 through the fourth communicating port 134 and flow into the terminal devices 200 which may be connected in parallel with each other.

Again, the exemplary terminal device 200 is the ventilating device 22 shown in FIG. 3 of the drawings. The ventilating device 22 may be arranged to provide fresh air to designated indoor space. The water (having relatively warmer temperature than ambient air) from the first main heat exchanger 13 may be guided to flow through the ventilating heat exchanging unit 222 to increase the temperature of the air retrieved from the air intake opening 2211 because the water may be arranged to perform heat exchange with the ambient air which has a relatively lower temperature. The water having released heat to the ambient air may have a decreased temperature and may then be pumped by the first pumping device 21 to flow back to the first main heat exchanger 13 for carrying out another heat exchange cycle with the refrigerant.

In the heat pump mode, the energy efficient arrangement 3 may be activated and a predetermined amount of water may circulate through various components of the energy efficient arrangement 3. The water may absorb heat from the first energy saver heat exchanger 31 which is connected in path 2 as described above. The water may then be guided to flow through the second energy saver heat exchanger 32 for releasing heat to the ambient air. The ambient air will then be pre-cooled before performing heat exchange with the ventilating heat exchange unit 222. The water flowing through the ventilating heat exchange unit 222 may then be guided to flow through the second pumping device 32 and eventually flow back to the first energy saver heat exchanger 31 for absorbing heat again. This completes one heat exchange cycle for the energy efficient arrangement 3.

One skilled in the art may appreciate that by pre-heating the ambient air by the energy efficient arrangement 3, the overall Coefficient of Performance (C.O.P) of the entire air conditioning and heat pump system may be substantially increased, because less energy may be used by the ventilating heat exchanging unit 222 to heat up ambient air. Yet ambient air must have been heated up before being delivered to the indoor space. By utilizing the heat of the refrigerant in path 2, the ambient air may be pre-heated so that less energy may be used to raise the temperature of the ambient air to a predetermined temperature target for being delivered to the indoor space. Moreover, by transferring some of the heat of the refrigerant flowing through path 2, the temperature of the refrigerant entering the second main heat exchanger 14 may be lowered as compared with conventional heat pump systems. The lower the temperature of the refrigerant entering the second main heat exchanger 14, the more heat the refrigerant may absorb from ambient air for a given compression performance. Thus, for a given work done by the compressor 12, more heat may be generated by the air conditioning and heat pump system.

Figure 5:
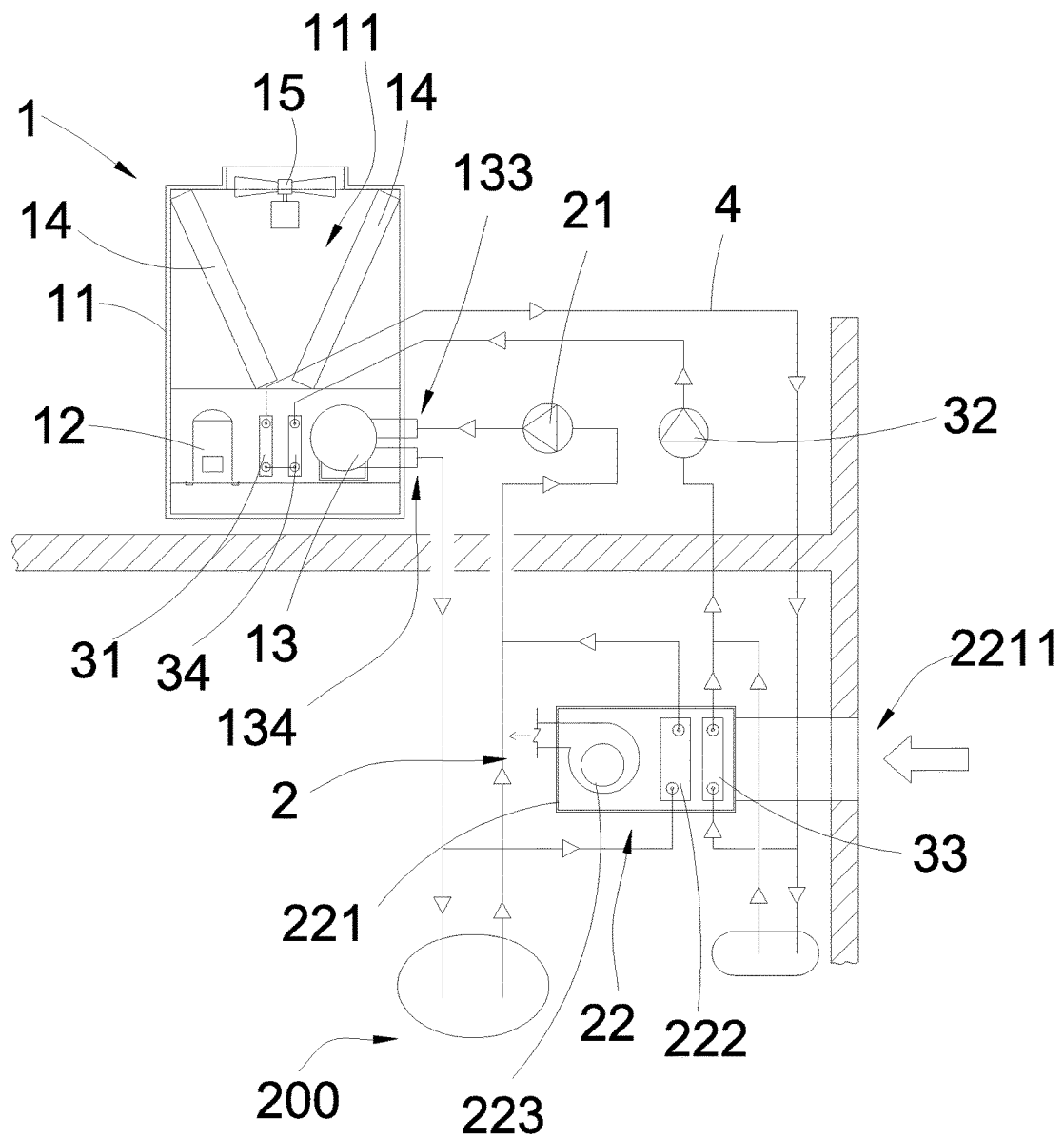
FIG. 5 is a schematic diagram of an air conditioning and heat pump system according to a second preferred embodiment of the present invention.
Figure 6:
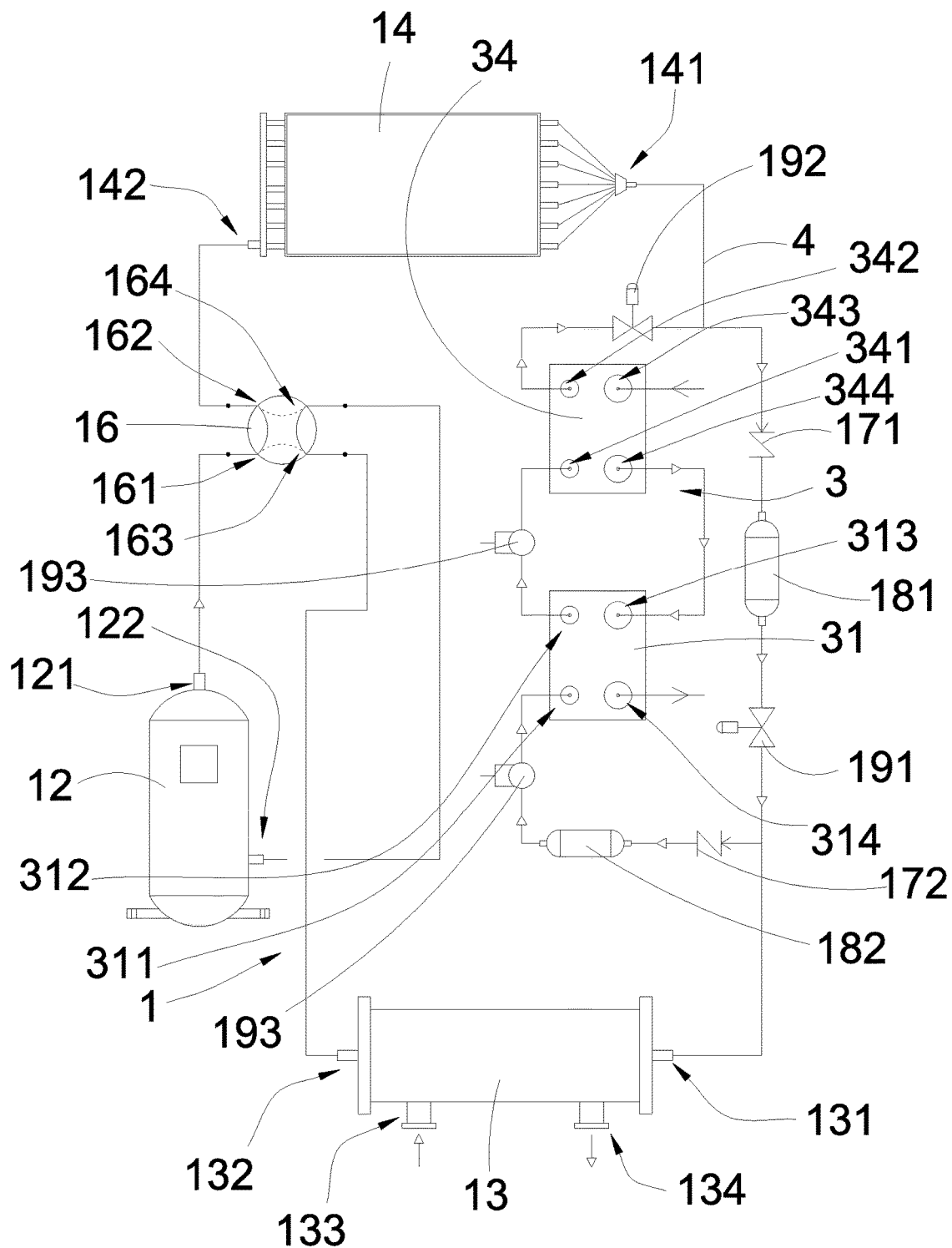
FIG. 6 is a schematic diagram of the air conditioning and heat pump system according to the second preferred embodiment of the present invention, illustrating a flow path of refrigerant.
Figure 7:
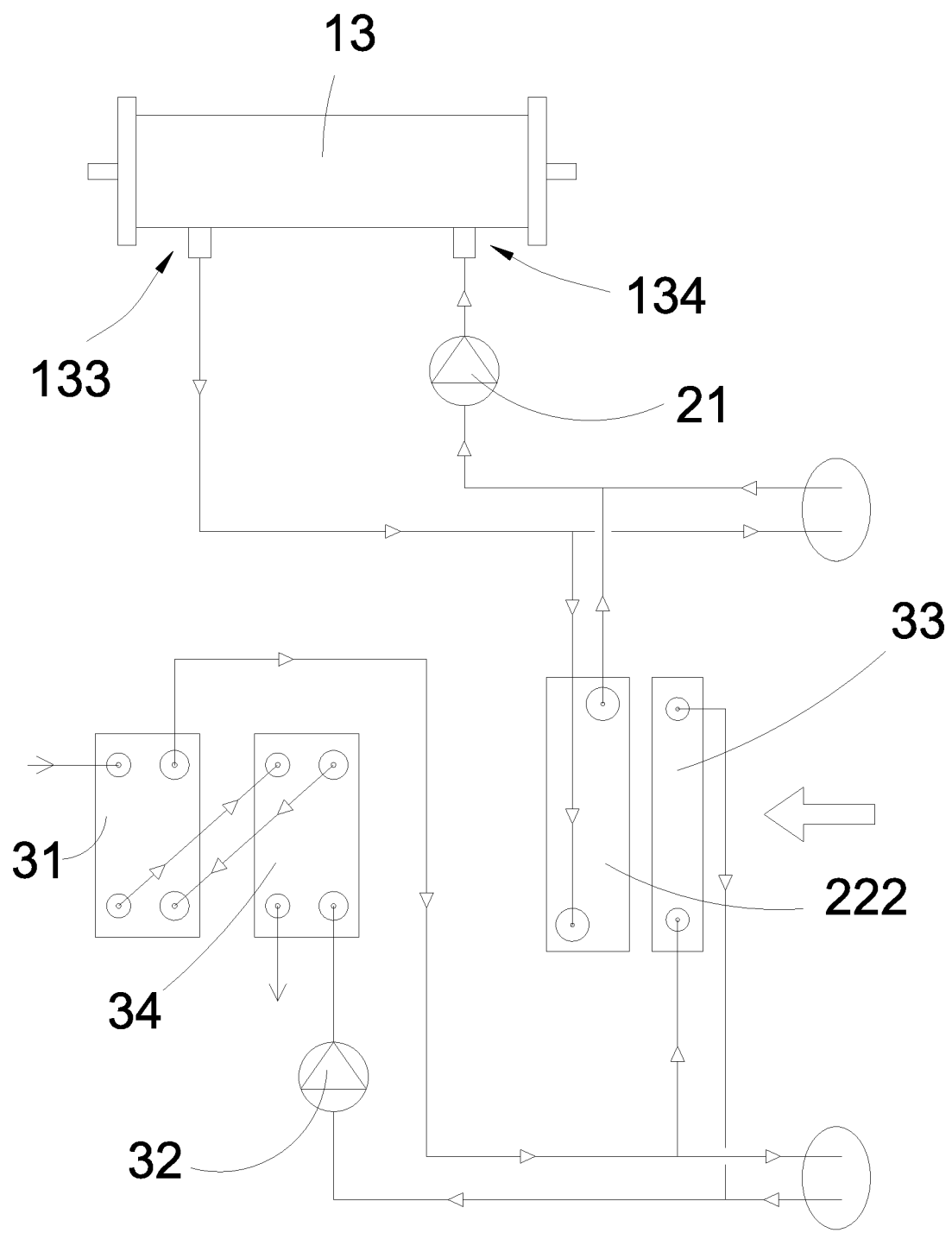
FIG. 7 is a simplified schematic diagram of the air conditioning and heat pump system according to the second preferred embodiment of the present invention, illustrating a flow path of water in an energy efficient arrangement.

Referring to FIG. 5 to FIG. 7 of the drawings, the air conditioning and heat pump system according to a second preferred embodiment of the present invention is illustrated. The second preferred embodiment is similar to that of the first preferred embodiment described above, except that the energy efficient arrangement 3 may further comprise a second energy saver heat exchanger 34 connected between the first energy saver heat exchanger 31 and the second expansion valve 192. According to the second preferred embodiment, the second energy saver heat exchanger 34 may be connected to the first energy saver heat exchanger 31 in series and in path 2 described above. Thus, the second energy saver heat exchanger 34 may have a second refrigerant inlet 341 connected to the first refrigerant outlet 312 of the first energy saver heat exchanger 31, and a second refrigerant outlet 342 connected to the second expansion valve 192 in path 2. On the other hand, the second energy saver heat exchanger 34 may further have a second water inlet 343 connected to the terminal device 200, and a second water outlet 344 connected to the first water inlet 313 of the first energy saver heat exchanger 31. The first water outlet 314 of the first energy saver heat exchanger 31 may be connected to the terminal device 200 for providing a return route for the water.

Furthermore, the main heat exchange system 1 may further comprise an additional depressurizing valve 193 connected between the first refrigerant outlet 312 and the second refrigerant inlet 341 for regulating the pressure of the refrigerant entering the second energy saver heat exchanger 34.

On the other hand, the first water inlet 313 of the first energy saver heat exchanger 31 may be connected to the second water outlet 344 of the second energy saver heat exchanger 34 so that the water leaving the second energy saver heat exchanger 34 may be guided to flow into the first energy saver heat exchanger 31 for absorbing additional heat from the first energy saver heat exchanger 31.

The operation of the present invention according to the second preferred embodiment is described as follows: the air conditioning and heat pump system described above involves a refrigerant flowing cycle and two independent water flowing cycles. The refrigerant flows through the various components of the main heat exchange system 1 while the water flows through the various components of the heat distribution system 2 and the energy efficient arrangement 3.

When the air conditioning and heat pump system is in the air conditioning mode, it is configured to generate cool air to designated indoor spaces. A refrigerant cycle starts from the compressor 12. Superheated or vaporous refrigerant may be arranged to leave the compressor 12 through the compressor outlet 121. The switching device 16 may be switched to the air conditioning mode. The refrigerant leaving the compressor 12 may pass through the first connecting port 161, the second connecting port 162, and enter the second main heat exchanger 14 through the second passage port 142. The refrigerant may then perform heat exchange with ambient air and release heat to the ambient air. The refrigerant may be converted into liquid state after releasing heat. The refrigerant may then be guided to exit the second main heat exchanger 14 through the first passage port 141. The refrigerant leaving the second main heat exchanger 14 may then be guided to flow through the first unidirectional valve 171, the first filtering device 181, and the first expansion valve 191 connected in path 1. The refrigerant may be prevented from entering path 2 by the second unidirectional valve 172 at this time. The refrigerant may then be guided to enter the first main heat exchanger 13 through the first communicating port 131. The refrigerant entering the first main heat exchanger 13 may then be arranged to perform heat exchange with the water circulating in the heat distribution system 2 so as to absorb heat from the water and be converted back into vaporous or superheated state. The refrigerant may then be guided to leave the first main heat exchanger 13 through the second communicating port 132. The refrigerant may then be guided to flow through the third connecting port 163 and the fourth connecting port 164 of the switching device 16 and eventually flow back to the compressor 12 through the compressor inlet 122. This completes one refrigerant cycle for air conditioning mode. Note that this refrigerant cycle is the same as in the first preferred embodiment.

On the other hand, a predetermined amount of water may circulate between the terminal devices 200 and the first main heat exchanger 13. The purpose of the water is to transfer the heat from the refrigerant to the terminal devices 200, which then deliver the heat to individual indoor spaces. As shown in FIG. 5 of the drawings, the refrigerant in the first main heat exchanger 13 may be arranged to absorb heat from the water also circulating in the first main heat exchanger 13. The water may then leave the first main heat exchanger 13 and flow into the terminal devices 200 which may be connected in parallel.

As in the first preferred embodiment, the exemplary terminal device 200 is the ventilating device 22 shown in FIG. 5 of the drawings. The ventilating device 22 may be arranged to provide fresh air to designated indoor space. The water (having relatively cooler temperature than ambient air) from the first main heat exchanger 13 may be guided to flow through the ventilating heat exchanging unit 222 to lower the temperature of the air retrieved from the air intake opening 2211 because the water may be arranged to perform heat exchange with the ambient air which has a relatively higher temperature. The water having absorbed heat from the ambient air may have an increased temperature and may then be pumped by the first pumping device 21 to flow back to the first main heat exchanger 13 for carrying out another heat exchange cycle with the refrigerant.

When the air conditioning and heat pump system is in the air conditioning mode, the energy efficient arrangement 3 may be deactivated.

When the air conditioning and heat pump system is in the heat pump mode, it is configured to generate heat to designated indoor spaces. The corresponding refrigerant cycle also starts from the compressor 12. Superheated or vaporous refrigerant may be arranged to leave the compressor 12 through the compressor outlet 121. The switching device 16 may be switched to heat pump mode. The refrigerant leaving the compressor 12 may pass through the first connecting port 161, the third connecting port 163, and enter the first main heat exchanger 13 through the second communicating port 132. The refrigerant may then perform heat exchange with the water so as to release heat to the water circulating in the first main heat exchanger 13. The refrigerant may be converted into liquid state after releasing heat. The refrigerant may then be guided to exit the first main heat exchanger 13 through the first communicating port 131. The refrigerant leaving the first main heat exchanger 13 may then be guided to flow through the second unidirectional valve 172, the second filtering device 182, and the depressurized valve 193 connected between the first energy saver heat exchanger 31 and the second filtering device 182. The refrigerant may be prevented from entering path 1 by the first unidirectional valve 171 at this time.

The refrigerant may then be guided to enter the first energy saver heat exchanger 31 of the energy efficient arrangement 3 through the first refrigerant inlet 311 for releasing heat to the water flowing through the first energy saver heat exchanger 31. The refrigerant may then be arranged to flow out of the first energy saver heat exchanger 31 through the first refrigerant outlet 312 and is guided to enter the second energy saver heat exchanger 34 of the energy efficient arrangement 3 through the second refrigerant inlet 341 for releasing heat to the water flowing through the second energy saver heat exchanger 34. The refrigerant may then leave the second energy saver heat exchanger 34 and may be guided to flow through the second expansion valve 192 in path 2. The first unidirectional valve 171 may prevent the refrigerant from entering path 1. As a result, the refrigerant may then be guided to enter the second main heat exchanger 14 through the first passage port 141. The refrigerant may be arranged to perform heat exchange and absorb heat from ambient air in the second main heat exchanger 14. The refrigerant may then evaporate to become vaporous or superheated state. The refrigerant may then be guided to leave the second main heat exchanger 14 through the second passage port 142. The refrigerant may then be guided to flow through the second connecting port 162 and the fourth connecting port 164 of the switching device 16 and eventually flow back to the compressor 12 through the compressor inlet 122. This completes one refrigerant cycle for the heat pump mode.

On the other hand, a predetermined amount of water may circulate between the terminal devices 200 and the first main heat exchanger 13. The purpose of the water is to transfer the heat from the refrigerant to the terminal devices 200, which then deliver the heat to individual indoor spaces. As shown in FIG. 5 of the drawings, the refrigerant in the first main heat exchanger 13 may be arranged to absorb heat from the water also circulating in the first main heat exchanger 13. The water may enter the first main heat exchanger 13 through the third communicating port 133. The water may then leave the first main heat exchanger 13 through the fourth communicating port 134 and flow into the terminal devices 200 which may be connected in parallel.

The exemplary terminal device 200 is the ventilating device 22 shown in FIG. 5 of the drawings. The ventilating device 22 may be arranged to provide fresh air to designated indoor space. The water (having relatively warmer temperature than ambient air) from the first main heat exchanger 13 may be guided to flow through the ventilating heat exchanging unit 222 to increase the temperature of the air retrieved from the air intake opening 2211 because the water may be arranged to perform heat exchange with the ambient air which has a relatively lower temperature. The water having released heat to the ambient air may have a decreased temperature and may then be pumped by the first pumping device 21 to flow back to the first main heat exchanger 13 for carrying out another heat exchange cycle with the refrigerant in the first main heat exchanger 13.

In the heat pump mode, the energy efficient arrangement 3 may be activated and a predetermined amount of water may circulate through various components of the energy efficient arrangement 3. The water may absorb heat from the first energy saver heat exchanger 31 and the second energy saver heat exchanger 34 which are connected in series in path 2. The water may then be guided to flow through the pre-heating heat exchanger 33 for releasing heat to the ambient air. The ambient air will then be pre-heated before performing heat exchange with the ventilating heat exchange unit 222. The water flowing through the pre-heating heat exchanger 33 may then be guided to flow through the second pumping device 32 and eventually flow back to the second energy saver heat exchanger 34 and the first energy saver heat exchanger 31 for absorbing heat again. This completes one heat exchange cycle for the energy efficient arrangement 3.

Specifically, as shown in FIG. 5 and FIG. 7 of the drawings, a predetermined amount of water may enter the second energy saver heat exchanger 34 through the second water inlet 343 from the pre-heating heat exchanger 33. The water may then absorb heat from the refrigerant passing through the second energy saver heat exchanger 34 and exit it through the second water outlet 344. The water leaving the second energy saver heat exchanger 34 may be guided to enter the first energy saver heat exchanger 31 through the first water inlet 313. The water may then absorb more heat from the refrigerant circulating through the first energy saver heat exchanger 31 and leave there through the first water outlet 314. The water leaving the first energy saver heat exchanger 31 may be guided to flow back to the pre-heating heat exchanger 33 located in the corresponding terminal device 200. As an example, the water leaving the first energy saver heat exchanger 31 may be guided to flow through the pre-heating heat exchanger 33 for pre-heating the ambient air retrieved through the air intake opening 2211.

The principles by which energy may be saved has been described above in the first preferred embodiment. Note that by passing through one more energy saver heat exchanger, the temperature of the refrigerant entering the second main heat exchanger 14 will be lower than that of the first preferred embodiment. The number of energy saver heat exchangers may be altered.

The present invention, while illustrated and described in terms of a preferred embodiment and several alternatives, is not limited to the particular description contained in this specification. Additional alternative or equivalent components could also be used to practice the present invention.

What is claimed is:
1. An air conditioning and heat pump system, comprising:
a plurality of connecting pipes;
a main heat exchange system, which comprises:
a main casing;
a compressor supported in said main casing, said compressor having a compressor outlet and a compressor inlet;
a first main heat exchanger supported in said main casing and connected to said compressor through at least one of said connecting pipes; and a second main heat exchanger supported in said main casing and connected to said compressor and said first heat exchanger through at least one of said connecting pipes;
a heat distribution system, which comprises:
a first pumping device connected to said first main heat exchanger of said main heat exchange system through at least one of said connecting pipes; and
at least one terminal device connected to said first pumping device and said first main heat exchanger through at least one of said connecting pipes, and comprises:
a ventilating device, which comprises:
a supporting frame having an air intake opening exposed to ambient air for allowing intake of air through said air intake opening;
a ventilating heat exchanging unit supported in said supporting frame and connected to said first pumping device and said first main heat exchanger for pre-heating said ambient air drawn from said air intake opening; and
a centrifugal fan unit supported in said supporting frame for drawing ambient air through said air intake opening, and delivering air to a predetermined indoor space; and
an energy efficient arrangement, which comprises:
a first energy saver heat exchanger connected to said first main heat exchanger and said second main heat exchanger through at least one of said connecting pipes;
a second pumping device connected to said first energy saver heat exchanger through at least one of said connecting pipes; and
a pre-heating heat exchanger supported in said supporting frame at a positioned between said ventilating heat exchanging unit and said air intake opening, said pre-heating heat exchanger being connected to said second pumping device and said first energy saver heat exchanger,
said air conditioning and heat pump system being selectively operated between an air conditioning mode and a heat pump mode, wherein in said air conditioning mode, a predetermined amount of vaporous refrigerant is arranged to leave said compressor and guided to enter said second main heat exchanger for releasing heat thereto, said refrigerant leaving said second main heat exchanger being guided to flow into said first main heat exchanger for absorbing heat, said refrigerant leaving said first main heat exchanger being guided to flow back to said compressor to complete an air conditioning cycle, a predetermined amount of water circulating through said ventilating device and said first main heat exchanger for releasing heat to said refrigerant, said water leaving said first energy saver heat exchanger being guided to flow into said ventilating heat exchanging unit for heating said ambient air flowing through said air intake opening;
wherein in said heat pump mode, a predetermined amount of vaporous refrigerant is arranged to leave said compressor and guided to flow into said first main heat exchanger for releasing heat to a predetermined amount of water circulating through said first main heat exchanger, said refrigerant leaving said first main heat exchanger being guided to flow into said first energy saver heat exchanger for releasing heat to said water circulating through said first energy saver heat exchanger, said refrigerant leaving said first energy saver heat exchanger being guided to flow into said second main heat exchanger for absorbing heat, said refrigerant leaving said second main exchanger being guided to flow to back said compressor to complete a heat pump cycle, said water circulating through said first energy saver heat exchanger for absorbing heat from said refrigerant, said water leaving said first energy saver heat exchanger being guided to flow into said pre-heating heat exchanger for releasing heat to said ambient air flowing through said air intake opening.

2. The air conditioning and heat pump system, as recited in claim 1, wherein said first energy saver heat exchanger has a first refrigerant inlet connected to said first main heat exchanger, a refrigerant outlet connected to said second main heat exchanger, a first water inlet connected to said pre-heating heat exchanger, and a first water outlet also connected to said pre-heating heat exchanger.

3. The air conditioning and heat pump system, as recited in claim 2, wherein said first main heat exchanger has a first communicating port and a second communicating port, and is configured to perform heat exchange between said refrigerant and water circulating in said heat distribution system, said first main heat exchanger being configured as an evaporator when said air conditioning and heat pump system is operated in said air conditioning mode, and as a condenser when said air conditioning and heat pump system is operated in said heat pump mode.

4. The air conditioning and heat pump system, as recited in claim 3, wherein said first main heat exchanger further has a third communicating port and a fourth communicating port, said third communicating port and said fourth communicating port being connected to said heat distribution system and serve as an inlet and an outlet for water circulating through said heat distribution system respectively.

5. The air conditioning and heat pump system, as recited in claim 4, wherein said second main heat exchanger has a first passage port and a second passage port, and is configured to perform heat exchange between said refrigerant and said ambient air for releasing heat from said refrigerant, said second main heat exchanger being configured to act as a condenser when said air conditioning and heat pump system is operated in said air conditioning mode, and as an evaporator when said air conditioning and heat pump system is operated in said heat pump mode.

6. The air conditioning and heat pump system, as recited in claim 5, wherein said main heat exchange system further comprises a switching device connecting between said first main heat exchanger and said second main heat exchanger, said switching device has first through fourth connecting ports, and is switched between an air conditioning switching mode and a heat pump switching mode, wherein in said air conditioning switching mode, said first connecting port is connected to said second connecting port, while said third connecting port is connected to said fourth connecting port, wherein in said heat pump switching mode, said switching device is switched so that said first connecting port is connected to said third connecting port, while said second connecting port is connected to said fourth connecting port.

7. The air conditioning and heat pump system, as recited in claim 6, wherein said first connecting port is connected to said compressor outlet of said compressor, said second connecting port being connected to said second passage port of said second main heat exchanger, said third connecting port being connected to said second communicating port of said first main heat exchanger, said fourth connecting port being connected to said compressor inlet of said compressor.

8. The air conditioning and heat pump system, as recited in claim 7, wherein said main heat exchange system further comprises a first unidirectional valve and a second unidirectional valve connected between said first main heat exchanger and said second main heat exchanger and in parallel, said first and said second unidirectional valve being configured to restrict a flow of refrigerant in one predetermined direction and not vice versa.

9. The air conditioning and heat pump system, as recited in claim 8, wherein said main heat exchange system further comprises a first filtering device and a second filtering device connected to said first unidirectional valve and said second unidirectional valve respectively.

10. The air conditioning and heat pump system, as recited in claim 9, wherein said main heat exchange system further comprises a first expansion valve, a second expansion valve connected to said first filtering device and said first energy saver heat exchanger respectively, said main heat exchange system further comprising a depressurizing valve connected between said first energy saver heat exchanger and said second filtering device.

11. The air conditioning and heat pump system, as recited in claim 2, wherein said energy efficient arrangement further comprises a second energy saver heat exchanger connected between said first energy saver heat exchanger and said second main heat exchanger, said second energy saver heat exchanger being connected to said first energy saver heat exchanger in series, and having a second refrigerant inlet connected to said first refrigerant outlet of said first energy saver heat exchanger, a second refrigerant outlet connected to said second main heat exchanger, a second water inlet connected to said terminal device, and a second water outlet connected to said first water inlet of said first energy saver heat exchanger, said first water outlet of said first energy saver heat exchanger being connected to said terminal device.

12. The air conditioning and heat pump system, as recited in claim 11, wherein said first water inlet of said first energy saver heat exchanger is connected to said second water outlet of said second energy saver heat exchanger so that said water leaving said second energy saver heat exchanger is guided to flow into said first energy saver heat exchanger for absorbing additional heat from said first energy saver heat exchanger.

13. The air conditioning and heat pump system, as recited in claim 12, being configured such that in said heat pump mode, a predetermined amount of vaporous refrigerant is arranged to leave said compressor and guided to flow into said first main heat exchanger for releasing heat to a predetermined amount of water circulating through said first main heat exchanger, said refrigerant leaving said first main heat exchanger being guided to sequentially flow into said first energy saver heat exchanger and said second energy saver heat exchanger for releasing heat to said water circulating through said first energy saver heat exchanger and said second energy saver heat exchanger, said refrigerant leaving said second energy saver heat exchanger being guided to flow into said second main heat exchanger for absorbing heat, said refrigerant leaving said second main exchanger being guided to flow to back said compressor to complete a heat pump cycle, a predetermined amount of water being guided to sequentially circulate through said second energy saver heat exchanger and said first energy saver heat exchanger for absorbing heat from said refrigerant, said water leaving said second energy saver heat exchanger being guided to flow into said first energy saver heat exchanger, said water leaving said first energy saver heat exchanger being guided to flow into said pre-heating heat exchanger for releasing heat to said ambient air flowing through said air intake opening for pre-heating said ambient air.

14. The air conditioning and heat pump system, as recited in claim 13, wherein said first main heat exchanger has a first communicating port and a second communicating port, and is configured to perform heat exchange between said refrigerant and water circulating in said heat distribution system, said first main heat exchanger being configured as an evaporator when said air conditioning and heat pump system is operated in said air conditioning mode, and as a condenser when said air conditioning and heat pump system is operated in said heat pump mode.

15. The air conditioning and heat pump system, as recited in claim 14, wherein said first main heat exchanger further has a third communicating port and a fourth communicating port, said third communicating port and said fourth communicating port being connected to said heat distribution system and serve as an inlet and an outlet for water circulating through said heat distribution system respectively.

16. The air conditioning and heat pump system, as recited in claim 15, wherein said second main heat exchanger has a first passage port and a second passage port, and is configured to perform heat exchange between said refrigerant and said ambient air for releasing heat from said refrigerant, said second main heat exchanger being configured to act as a condenser when said air conditioning and heat pump system is operated in said air conditioning mode, and as an evaporator when said air conditioning and heat pump system is operated in said heat pump mode.

17. The air conditioning and heat pump system, as recited in claim 16, wherein said main heat exchange system further comprises a switching device connecting between said first main heat exchanger and said second main heat exchanger, said switching device has first through fourth connecting ports, and is switched between an air conditioning switching mode and a heat pump switching mode, wherein in said air conditioning switching mode, said first connecting port is connected to said second connecting port, while said third connecting port is connected to said fourth connecting port, wherein in said heat pump switching mode, said switching device is switched so that said first connecting port is connected to said third connecting port, while said second connecting port is connected to said fourth connecting port.

18. The air conditioning and heat pump system, as recited in claim 17, wherein said first connecting port is connected to said compressor outlet of said compressor, said second connecting port being connected to said second passage port of said second main heat exchanger, said third connecting port being connected to said second communicating port of said first main heat exchanger, said fourth connecting port being connected to said compressor inlet of said compressor.

19. The air conditioning and heat pump system, as recited in claim 18, wherein said main heat exchange system further comprises a first unidirectional valve and a second unidirectional valve connected between said first main heat exchanger and said second main heat exchanger and in parallel, said first and said second unidirectional valve being configured to restrict a flow of refrigerant in one predetermined direction and not vice versa.

20. The air conditioning and heat pump system, as recited in claim 19, wherein said main heat exchange system further comprises a first filtering device and a second filtering device connected to said first unidirectional valve and said second unidirectional valve respectively.

21. The air conditioning and heat pump system, as recited in claim 20, wherein said main heat exchange system further comprises a first expansion valve, a second expansion valve connected to said first filtering device and said first energy saver heat exchanger respectively, said main heat exchange system further comprising a depressurizing valve connected between said first energy saver heat exchanger and said second filtering device.

\* \* \* \* \*